May 17, 1960
C. A. VOSSBERG
2,937,327
PULSING METHODS AND APPARATUS FOR THE
CONTROL OF MOVABLE MEMBERS
Filed Feb. 21, 1957
2 Sheets-Sheet 1
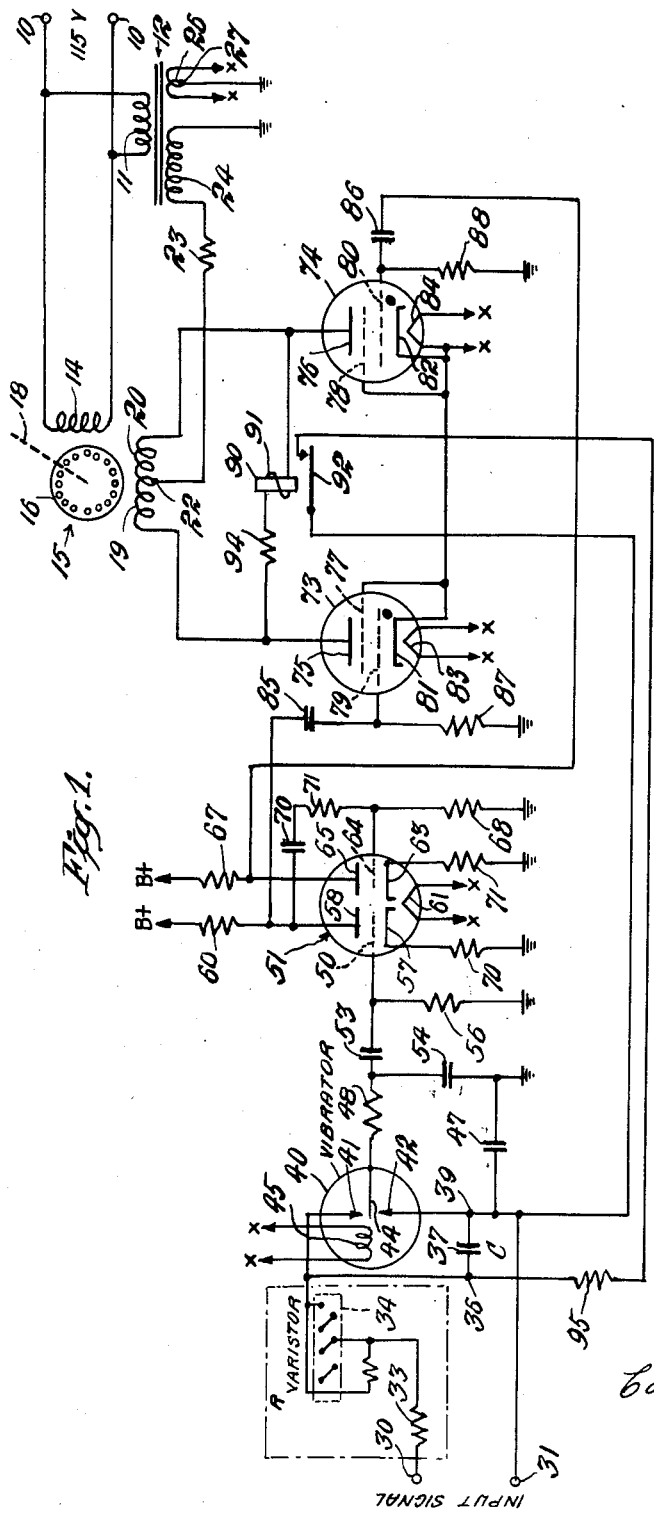
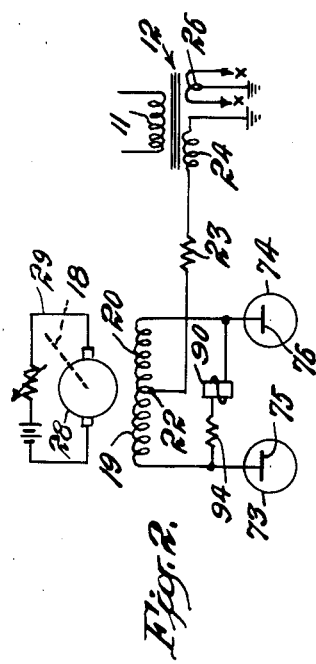
INVENTOR.
Carl A. Vossberg
BY
ATTORNEY INVENTOR.
Carl A. Vossberg,
BY
P. Stephen Baker
ATTORNEY United States Patent Office 2,937,327
Patented May 17, 1960

2,937,327

PULSING METHODS AND APPARATUS FOR THE CONTROL OF MOVABLE MEMBERS

Carl A. Vossberg, Umatilla, Fla.

Application February 21, 1957, Serial No. 641,512

18 Claims. (Cl. 318—448)

The present invention relates to pulsing methods and apparatus for the control of servomotors or the like. It is particularly directed to servomotor control systems wherein averaging effects are utilized for the exclusion of noise appearing in the input signal and for reducing the effects of other disturbances of a transient character. The foregoing is accomplished by a damping or integrating action but without introducing into the control system the time lag or delay effects which are inherent in conventional integrating systems of this type which are arranged for response to an average rather than to the instantaneous amplitude of the input or error signal.

A principal feature of the invention is its ability to respond substantially instantaneously to abrupt changes in amplitude of the input or error signal which controls the servomotor and yet paradoxically, to remain insensitive to transient disturbances such as noise or the like appearing as undesired components of the error signal.

Briefly, the invention comprises a capacitor to which the error signal is continuously applied, a reversible servomotor, trigger-type control circuitry preferably including thyratrons responsive to the voltage appearing at the terminals of the capacitor for causing response of the servomotor to the error signal, and means, advantageously in the form of a relay operated by the thyratrons, which discharges the capacitor as soon as the time-magnitude integrated voltage across its terminals rises to a predetermined maximum value at which thyratron firing takes place.

The capacitor, which serves as an error signal integrator, is thus repeatedly discharged by the relay each time that the energy stored in the capacitor causes its terminal voltage to attain a predetermined maximum potential. Each relay operation is accompanied by the application of a single pulse of torque to the servomotor. The repetition rate of the pulses becomes more rapid (the servomotor speed increasing accordingly), whenever an increase in the amplitude of the error signal increases the charging rate of the capacitor so that its terminal voltage reaches the fixed maximum value in a shorter time interval.

By arranging the thyratrons or other trigger circuitry so that it responds to a relatively low terminal voltage across the capacitor, the capacitance of the capacitor may be made relatively large without introducing undue delay in charging the capacitor to the low maximum potential. Advantageously, the large value of capacitance operates effectively as a filter element to eliminate the effects of noise or other undesired transient disturbances which may appear as components of the error signal. The short charging time, however, provides for rapid response to variations in the magnitude of the error signal.

Additional features of the invention and other advantages thereof will become apparent upon reading the following specification together with the accompanying drawing forming a part thereof.

Referring to the drawing:

Figure 1 is a schematic circuit diagram of a servomotor control system in accordance with the invention;

Figure 2 is a fragmentary circuit diagram showing a modified form of servomotor;

Figure 4:
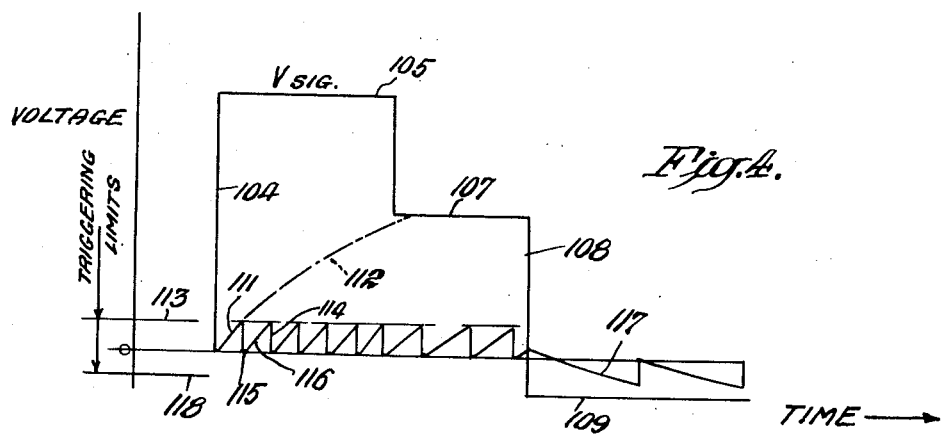
Figure 5:
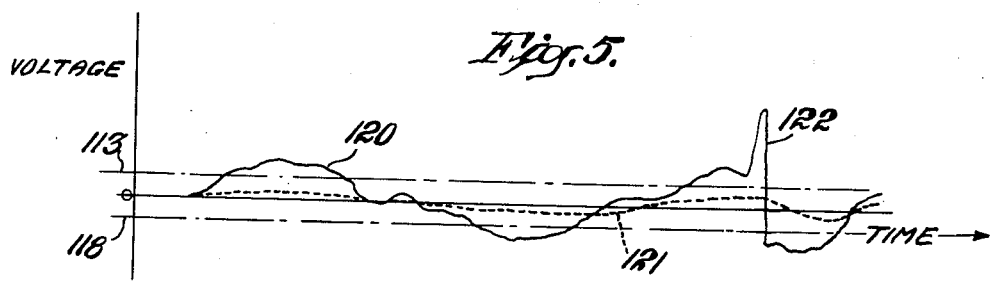

Figure 4 is a time-voltage diagram showing the terminal voltage of a capacitor included in a control system in accordance with the present invention, the control signal rising abruptly to a value at which it remains constant, then dropping abruptly to a reduced value at which it likewise remains constant, and finally abruptly reversing in polarity to a still further reduced value at which it again remains constant; and Figure 5 is a time-voltage diagram illustrating an erratic error signal and the response thereto of a servomotor controlled in accordance with the invention.

Referring to Figure 1, there is shown a pair of power supply terminals 10 adapted to be energized from a suitable source of alternating current (not shown) such as the usual 115 volt 60 cycle commercial power supply circuit. The supply terminals 10 are connected to energize the primary winding 11 of a power transformer designated generally as 12. The power supply terminals 10 are also connected to energize the main operating or main field winding 14 of a servomotor designated generally as 15. The servomotor 15 is provided a rotor 16 which is adapted to drive a desired load (not shown) by means of a suitable mechanical driving connection diagrammatically illustrated by a dotted line 18.

The servomotor 15 is of the shaded pole reversible type and is provided with auxiliary or shading coil windings 19 and 20. The two auxiliary windings 19 and 20 are appropriately displaced in magnetic position from the main winding 14. Instead of being selectively short-circuited in conventional manner for producing rotation of the rotor 16 in one direction or the other, current flow through one or the other of the windings 19 or 20 is controlled by the individual firing of either of two thyratrons, later to be described. Current flow of proper phase in shading winding 19 will cause the generation of torque to drive rotor 16 in one direction and current flow in winding 20 will drive rotor 16 in the opposite direction. Without any effective shading coil excitation, as with no current flow in either winding 19 or 20 or with balanced currents flowing in both windings, the rotor 16 will remain stationary. By providing periodic or pulsed excitation, either of winding 19 or 20 alone or by providing an unbalance in excitation therebetween, the speed and direction of rotation of rotor 16 may be controlled at will. The maximum speed of the rotor 16 is determined in conventional manner by the line frequency, the number of field poles, and the amount of rotor slip.

The shading windings 19 and 20 are provided with a common or center tap terminal 22. Terminal 22 is connected through a current limiting resistor 23 to one side of a secondary winding 24 of the power transformer 12. The other side of secondary winding 12 is grounded. The transformer 12 is also provided with a low voltage secondary winding 26 having a grounded center tap 27. The low voltage winding 26 is used to supply current for cathode heating, biasing, and other purposes as hereinafter described, the points x—x being connected to similarly designated points throughout Figure 1 of the drawing.

While a shaded pole type of induction motor has been shown by way of illustration, it is to be understood that any other form of pulse responsive servomotor may be used, the speed and direction of rotation of which may be controlled by pulses as described in greater detail below. For example, as shown in Figure 2, the main field winding 14 could be eliminated and the rotor 16 then be replaced by a direct current armature and commutator structure 28 supplied with a constant or adjustably constant unidirectional armature current by a direct current energizing circuit 29.

The error signal for controlling the speed and direction of rotation of the rotor 16 is applied to a pair of input terminals 30 and 31. The error signal is a unidirectional control potential, derived in any well known manner, the polarity of which will determine the direction of rotation of rotor 16, the speed of rotation of rotor 16 being larger or smaller in accordance with the absolute magnitude or amplitude of the error signal. For an error signal of zero, the rotor 16 will remain stationary.

The input terminal 30 is connected through a fixed resistor 33 to a non-linear resistive circuit element 34 commonly referred to as a varistor. The resistance of the varistor 34 decreases accompanying an increase in the voltage applied thereto. The total resistance R of the serially connected resistive circuit elements 33 and 34 is thus less for larger magnitudes of error signal voltage than for smaller magnitudes thereof. The varistor 34 is connected to one terminal 36 of an error signal integrating capacitor 37. The other terminal 39 of integrating capacitor 37 is connected directly to the other input terminal 31. Capacitor 37 is of large capacitance C so that the value of RC for the circuit 33—34—37 provides a large time constant for averaging out or integrating the value of the error signal applied to the input terminals 30 and 31.

There is a converter or vibrator 40 which is provided with stationary contacts 41 and 42. The chopper or vibrator 40 comprises a movable contact member 44 which is driven at line frequency by an operating winding 45 energized from the low voltage secondary winding 26 of power transformer 12. The stationary contacts 41 and 42 of vibrator 40 are directly connected to capacitor terminals 36 and 39, respectively. Thus, there will be a potential difference between the stationary contacts 41 and 42 which is equal to the terminal voltage to which the capacitor 37 is charged and the polarity of this potential difference will be determined by the polarity of the input signal. Since the moving contact 44 of vibrator 40 travels between two points having a direct current potential difference between them, it will have on it a potential which is alternately higher and lower with respect to ground, the change in potential taking place at line frequency (ordinarily 60 cycles). The direct current potential to which the integrating capacitor 37 is charged at any time is converted by the vibrator 40 to an alternating potential of line frequency and of peak magnitude determined by the terminal voltage to which the capacitor 37 is charged. From an alternating current standpoint, terminal 39 of capacitor 37 and input terminal 31 are grounded through a by-pass capacitor 47. As a result, there appears on the moving contact 44 of vibrator 40, an alternating potential with respect to ground which has a peak magnitude determined by the magnitude of the voltage to which the integrating capacitor 37 is charged. The phase or polarity of this alternating voltage with respect to the supply voltage at power terminals 10 will depend upon the polarity of the charge accumulated by the integrating capacitor 37.

One side of a resistor 48 of low resistance is connected to moving contact 44 of vibrator 40. The other side of resistor 48 is connected to a grid electrode 50 of a twin triode 51 through a coupling capacitor 53. The changing potential on the moving vibrator contact 44 thus appears as an alternating potential with respect to ground on the grid 50 of twin triode 51. The phase of this alternating grid potential with respect to the alternating current supply at terminals 10 will depend upon the polarity of the input signal at terminals 30—31 and the corresponding polarity with which the capacitor 37 is charged. As described in greater detail below, the twin triode 51 is connected as a combined amplifier and phase inverter. The junction between resistor 48 and coupling capacitor 53 is connected to ground through a capacitor 54 of small capacitance for the drainage of high frequency components. The grid 50 is biased at ground potential through a grid resistor 56.

The grid 50 controls the flow of space current between an indirectly heated cathode 57 and an anode 58. The anode 58 is connected to a suitable source of direct current anode potential designated B+ through a coupling resistor 60. The cathode 57 is heated by a heater 61 energized from the low voltage winding 26 of power transformer 12.

The heater 61 also heats a further cathode 63 of the twin triode 51. A further grid 64 controls the flow of space current from the cathode 63 to an anode 65. The anode 65 is connected to the source of direct current anode voltage B+ through a coupling resistor 67. The grid 64 is biased at ground potential through a grid resistor 68.

Phase inversion between the anodes 58 and 65 is provided by a coupling connection from anode 58 to grid 64 through a capacitor 70 in series with a resistor 71. The cathodes 57 and 63 are maintained at appropriate positive potentials with respect to grids 50 and 64 by cathode biasing resistors 70 and 71, respectively.

The phase inverter 51 is connected to fire one or the other of a pair of trigger-type control devices exemplified by thyratrons 73 and 74. The thyratrons 73 and 74 comprise anodes 75 and 76, screen grids 77 and 78, control grids 79 and 80, indirectly heated cathodes 81 and 82 and heaters 83 and 84, respectively. The heaters 83 and 84 are energized from the low voltage secondary winding 26 of power transformer 12.

The control grids 79 and 80 are connected to the anodes 58 and 65 of the phase inverter 51 through coupling capacitors 85 and 86, respectively. The control grids 79 and 80 are biased at ground potential through grid resistors 87 and 88, respectively. The screen grids 77 and 78 and cathodes 81 and 82 of the thyratrons 73 and 74 are all connected together and connected to one side of the low voltage secondary winding 26 which supplies the heaters 83 and 84. The center point of low voltage winding 26 is grounded and an alternating current biasing potential with respect to ground is therefore applied to the cathodes 81 and 82 and hence with respect to the control grids 79 and 80 which are biased at ground potential. The polarity of this bias is preferably so selected that the thyratrons 73 and 74 are normally in an unfired condition, although the circuit may alternatively be operated with the reverse polarity of bias so that both thyratrons are normally fired. The anodes 75 and 76 are energized from the secondary winding 24 of the power transformer 12 each in series with one of the shading coil windings 19 and 20, respectively, of the servomotor 15.

A relay designated generally 90 is shown provided with an operating winding 91 and contacts 92 which close upon energization of the winding 91. One side of the operating winding 91 is connected to the anode 75 of thyratron 73 through a series resistor 94. The other side of the operating winding 91 is connected directly to the anode 76 of thyratron 74. The relay 90 is of the sensitive high speed type and the series resistor 94 serves to reduce the time constant of the inductive circuit 94—91, thus further increasing the speed of response of the relay 90. The contacts 92 of relay 90 are connected to discharge the integrating capacitor 37 through a limiting resistor 95 of low resistance, the resistor 95 serving to protect the relay contacts 92 against excessive discharge currents which would reduce the contact life of the relay 90.

In operation, the error signal voltage applied to input terminals 30 and 31 may be derived in part from a potentiometer (not shown) controlled by the mechanical output connection 18 to rotor 16 so that when the rotor 16 assumes a desired angular position of rotation, the error signal voltage is reduced to zero. Alternatively, it may be derived in part from a tachometer generator mechanically driven by the output connection 18 so that when the rotor 16 assumes a desired direction and speed of rotation, the error signal voltage becomes zero. Such arrangements for obtaining and balancing out the error signal voltage for control of the servomotor 15 are well known in the art and the system of the present invention may be used in any control arrangement wherein a unidirectional control signal is used to control the direction and amount of displacement or the direction and speed of rotation of a servomotor in accordance with the polarity and magnitude of the control signal. By provision of the varistor 34, the circuit is disproportionately responsive to large error signals as compared with error signals of small amplitude, thus increasing its speed of response while at the same time reducing its tendency to hunt or overshoot as the error signal approaches zero magnitude.

The error signal slowly charges the integrating capacitor 37 through the serially connected resistive circuit elements 33, 34. As the voltage between capacitor terminals 36 and 39 builds up with one polarity or the other, the vibrator contact 44 applies an alternating potential of increasing peak amplitude to the control grid 50 of the amplifier phase inverter 51. The polarity or phasing of this alternating potential with respect to the anode voltages of like phase of the thyratrons 73 and 74 will be determined by the polarity of the direct current voltage between capacitor terminals 36 and 38. Accordingly, the phase inverter 51 will apply a voltage of increasing magnitude to one or the other of the control grids 79 or 80 so phased that it tends to fire its associated thyratron 73 or 74, as the case may be, while the increasing voltage applied to the other grid will be opposite in phase and will tend to prevent firing of the other thyratron, the anodes 75 and 76 being energized together from transformer secondary winding 24 in phase with each other. The particular one of the two thyratrons 73 or 74 which is to be fired will thus be determined by the polarity of the error signal which is applied to input terminals 30 and 31. When the integrating capacitor 37 has become charged to a predetermined potential, one or the other of the thyratrons 73 or 74 will fire. If thyratron 73 fires, then shading winding 19 of servomotor 15 will have a current flow therethrough which will cause rotation of the rotor 16 in one direction. The magnetic displacement of the shading winding 19 will cause a current induced by main winding 14 to flow in appropriate phase to apply torque to rotor 16 while thyratron 73 remains ionized. If the error signal should be of opposite polarity, then thyratron 74 will fire and current will flow through the shading winding 20 to cause rotation of rotor 16 in the opposite direction. As soon as either thyratron 73 or 74 fires, relay contacts 92 close and immediately discharge the integrating capacitor 37 through the resistor 95. A single pulse of torque-producing energy is induced in the shading coil winding 19 or 20, depending upon the desired direction of rotation for the rotor 16, each time that the integrating capacitor 37 reaches the low predetermined maximum potential at which one or the other of the thyratrons 73 or 74 will be caused to fire. The rotor 16 is thus subjected to a series of uniform impulses of torque, the repetition rate of the impulses being determined by the amplitude of the error signal and with the direction of the torque impulses being determined by the polarity of the error signal.

Figure 3:
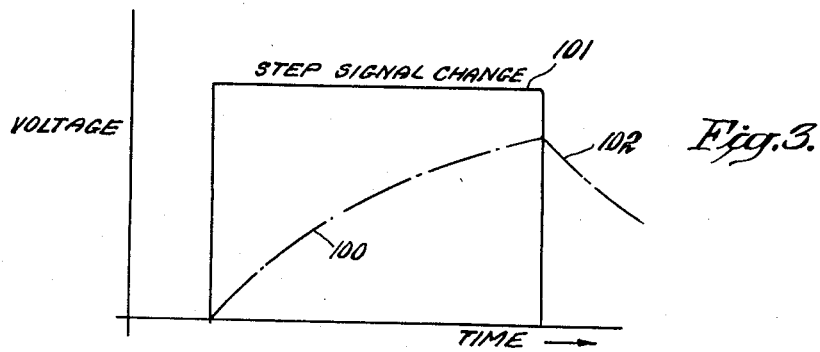
Figure 3 is a time-voltage diagram showing the charging and discharging of a conventionally arranged capacitor in response to an error signal which rises abruptly, remains constant, and then drops abruptly to zero.

This may be seen by reference to Figures 3, 4 and 5. In Figure 3, the terminal voltage of the capacitor 37 is represented as it would respond to an error signal without the relay 90. Curve 100 shows the slow charging of the capacitor in response to an error signal 101. As shown, the error signal 101 rises abruptly from zero to a steady state value and then abruptly drops back again to zero. While the error signal 101 is at its steady state off-zero value, the capacitor voltage increases exponentially in well known manner as indicated by the curve 100. When the error signal drops back to zero, the capacitor voltage decays exponentially as indicated by the curve 102. This type of operation is conventional and although it eliminates the effects of noise components and other irregularities in the error signal, it involves undesirable time lags in the response of the servo system.

Figure 4 shows the operation of a system in accordance with the present invention. The error signal illustrated, which is shown only by way of example, rises abruptly in a positive going direction as indicated at 104, assumes a constant positive steady state value 105, drops abruptly to a reduced constant steady state value 107, then reverses in polarity as indicated at 108, finally assuming a still further reduced constant steady state value 109 with negative polarity.

In response to the error signal 104, 105, 106, 107, 108, 109 the capacitor 37 is initially charged in a positive going direction as indicated at 111. If charging were permitted to continue, the time-voltage curve would be of exponential shape as indicated by the extension 112 of curve 111 shown in dotted lines. However, when the curve 111 reaches a predetermined maximum limiting value as indicated by the horizontal line 113, thyratron 73, for example, will fire and deliver a pulse of energy to the shading coil winding 19 which it will be assumed generates a torque urging the rotor 16 in a clockwise direction. At the same time, relay 90 is operated causing contacts 92 to discharge the capacitor 37 through the resistor 95. The voltage of capacitor 37 thereupon drops abruptly to zero as indicated at 114 and remains at zero for a slight interval as indicated at 115, the duration of the interval 115 being determined by the inherent release time of the fast acting relay 90 required for the relay to open its contacts 92 after closure thereof. Immediately after the relay contacts 92 have opened, the signal 105 commences a recharging of the capacitor 37 as indicated at 116 and this recharging proceeds until the limiting voltage is reached as indicated by the horizontal line 113 whereupon the thyratron 73 fires again and the relay 90 again discharges the capacitor 37. As a result, the thyratron 73 fires repeatedly and the fast acting relay 90 operates repeatedly at a repetition rate determined by the rate of charging of the capacitor 37. This charging rate, in turn, is determined by the amplitude of the error signal at 105. If the maximum voltage 113 is a small fraction of the error signal amplitude 105, the time-voltage charging curve will be substantially linear and the repetition rate of the successive firings of the thyratron will be substantially proportional to the amplitude of the error signal voltage at 105.

If the varistor 34 is used, then the repetition rate for error signals of large amplitude will be materially higher than would otherwise be the case, the increased repetition rate being caused by a reduction in the resistance of the varistor 34 which accompanies the application of a relatively high voltage thereto. The varistor 34 causes the charging rate or rate of storage of energy by the the integrating capacitor 37 to be increased for error signals of larger amplitudes so that it exceeds a rate proportional to the charging rate for error signals of smaller amplitudes. As a result, the repetition rate of successive firings of either of the thyratrons 73 or 74 is correspondingly increased for error signals of larger amplitudes and disproportionately decreased for error signals of smaller amplitudes.

When the error signal drops to a reduced value at 107, the capacitor 37 charges more slowly and an increased time is required for it to reach the maximum voltage 113. Accordingly, the repetition rate of successive firings of the thyratron 73 is reduced and pulses of energy are delivered to the shading coil winding 19 of the servomotor 15 less frequently with a corresponding reduction in the speed of rotation of the rotor 16. This is indicated by the increased spacing between zero potential points as shown in the central portion of Fig. 4.

When the error signal of Figure 4 reverses in polarity and assumes a negative value as indicated at 109, the capacitor 37 then becomes charged in the opposite direction as indicated at 117. As a result, the alternating potential which appears on the moving contact 44 of vibrator 40 becomes reversed in phase. This causes the voltage on anode 65 of phase inverter 51 to be correct in phase for the firing of thyratron 74 whereas the voltage on anode 58 is so phased as to prevent the firing of thyratron 73 which was previously fired. Accordingly, in response to the error signal 109, the thyratron 74 fires repeatedly each time that the potential on capacitor 37 attains the predetermined maximum negative value indicated by the horizontal line 118. Each time that the thyratron 74 is fired, a pulse of torque is produced by the other shading coil winding 20 of the servomotor 15 and the torque applied to the rotor 16 is reversed with respect to that produced by the shading coil 19 so that it revolves in the opposite or counterclockwise direction. The speed of rotation of the rotor 16, as before, is determined by the repetition rate of the pulses which is slower than that produced by the error signal 107 as shown by the still further increased spacing between zero potential points on the capacitor voltage curve.

From the foregoing, it will be seen that the direction and speed of rotation of the rotor 16 will be determined by the polarity and magnitude of the error signal applied to the input terminals 30 and 31. In the embodiment illustrated in Figure 1, the maximum speed of rotation of rotor 16 will be reached when either of the thyratrons 73 or 74 is fired at maximum frequency which is at the line frequency of the power supply. The line frequency thus determines the maximum repetition rate of firing and the minimum time interval between successive pulses. In the embodiment of Figure 2, a similar condition will prevail, but the maximum speed of the armature 28 will be determined by its direct current energizing circuit 29. Further, in the embodiment of Figure 2, the frequency of the power supply which energizes the transformer winding 24 and winding 26 may be increased to provide a higher maximum repetition rate of thyratron firing than is possible with the usual commercial power supply and this frequency may be higher than any frequency suitable for motor operation.

It will be seen from Figure 4, that there is a dead zone between the positive and negative voltage limits 113 and 118 in which neither thyratron will respond to the error signal. This dead zone provides a desirable stable condition wherein no torque is applied to the rotor 16. The magnitude of the gap between the voltage limits 113 and 118 may be reduced, if desired, by increasing the gain of the phase inverter 51 or by adding one or more stages of amplification ahead of its control grid 50. Alternatively, the grids 79 and 80 of the thyratrons 73 and 74 may be so biased that firing occurs in response to an error signal of lesser magnitude than that shown in Figure 4.

Figure 5 illustrates how the control system of the invention is unresponsive to noise and other disturbances. The error signal, designated generally as 120, is erratic but has an average value of zero. The terminal voltage of capacitor 37 at terminals 36 and 39 represented by the dotted line 121 varies slowly because of the large time constant of the resistor-capacitor circuit 33—34—37. The terminal voltage of capacitor 37 represented by the dotted line 121 remains within the limits of the dead zone between the maximum voltage lines 113 and 118. Even a sharp peak in the error signal voltage as indicated at 122 is not of sufficient duration to charge the capacitor 37 up to the voltage required for thyratron firing. If the error signal should change so that it has a small off-zero component, then the capacitor 37 will ultimately become charged to one of the thyratron firing voltages 113 or 118 and a pulse of torque will be applied to the rotor 16. However, substantially instantaneous response will be obtained if a steady error voltage is suddenly applied to input terminals 30 and 31 which has a magnitude appreciably outside the scope of the dead zone 113—118. This has been shown and described in connection with Figure 4 above.

Accordingly, there is provided a simple fast-response system capable of filtering or averaging out transient disturbances and small noise components and which provides a rotor speed effffectively proportional to the amplitude of the error signal up to maximum rotor speed including the provision of disproportionately high rotor speed for large error signals, when desired.

It will be appreciated that changes and modifications may be made in the embodiments of the invention which are herein illustratively disclosed without departing from the spirit and scope of the invention as defined in the appended claims.

What is claimed is:

1. The method of controlling the velocity and direction of displacement of a movable member in either of two opposite directions in accordance with the polarity and amplitude of a unidirectional control signal, said method comprising the steps of continuously integrating the amplitude of said control signal with respect to time, applying a pulse of energy to said movable member to cause displacement thereof in the one of said two directions corresponding to the polarity of said control signal whenever the magnitude of the integral resulting from said integrating step attains a predetermined maximum value, and repeating said integrating step commencing from zero each time that said energy applying step is performed.

2. The method of controlling the velocity and direction of displacement of a movable member in either of two opposite directions in accordance with the polarity and amplitude of a unidirectional control signal, said method comprising the steps of continuously storing energy at a rate determined by the amplitude of said control signal, said stored energy having a directional characteristic determined by the polarity of said signal, applying a pulse of force to said movable member to cause displacement thereof whenever the quantity of said stored energy attains a predetermined maximum magnitude, the direction of said force being such as to cause displacement of said member in accordance with said directional characteristic, and repeating said storing step starting from zero each time that a pulse of force is applied to said movable member.

3. The method according to claim 2, wherein the rate at which said energy is stored for the larger amplitudes of said control signal exceeds a rate proportional to the rate of storage for the smaller amplitudes thereof.

4. The method of controlling the angular velocity and direction of rotation of a revoluble member in accordance with the polarity and amplitude of a unidirectional control signal, said method comprising the steps of continuously electrostatically storing energy at a rate in accordance with the amplitude of said signal, said stored energy having a polarity determined by the polarity of said signal, applying a pulse of torque to said revoluble member when the potential of said stored energy attains a predetermined maximum magnitude, the direction of said torque being determined by the polarity of said stored energy, discharging said stored energy concurrently with said application of torque, repeating said storing step commencing with a potential of zero, and repeating said torque applying and discharging steps when said stored energy again attains said predetermined potential, whereby the repetition rate of said pulses is more rapid for larger amplitudes of said control signal than for smaller amplitudes thereof.

5. The method according to claim 4, wherein said storing step is performed for the larger amplitudes of said signal at a rate which exceeds a rate proportional to the rate of storage for the smaller amplitudes thereof.

6. A servomotor control system of the class described, comprising an input circuit to which an error signal is to be applied, continuously operative time-amplitude signal integrating means connected to said input circuit for response to said error signal, control means connected to said integrating means for response thereto, said control means having a threshold rendering it unresponsive to said integrating means until the time-amplitude integral of said error signal has attained a predetermined minimum magnitude, said control means being actuated by said integrating means when the magnitude of said integral attains said minimum magnitude, resetting means actuated by said control means and connected to said integrating means for reducing said time-amplitude integral to zero upon each actuation of said control means, and servomotor means responsive to said control means.

7. A system according to claim 6, further comprising a resistive circuit element of non-linear resistance characteristics included in said input circuit, said circuit element increasing the rate of response of said integrating means for error signals of large amplitudes with respect to signals of smaller amplitudes.

8. A servomotor control system of the class described, comprising in combination, an input circuit adapted to have an error signal applied thereto, energy storage means continuously connected to said input circuit for integrating the amplitude of said error signal with respect to time, trigger-type control means connected to said storage means, said control means being actuated whenever the amount of energy stored in said storage means increases to a predetermined magnitude, said control means producing a pulse upon each actuation thereof, discharge means connected to said control means for response to each pulse, said discharge means being connected to said storage means for discharging the energy stored therein upon actuation of said control means, and servomotor means connected to said control means for response thereto, the speed of operation of said servomotor means increasing with an increase in the repetition rate of said pulses.

9. A control system according to claim 8, further comprising circuit means of non-linear resistance connected between said input circuit and said storage means, said circuit means causing a disproportionality between the amplitude of said error signal and the repetition rate of said pulses.

10. A control system according to claim 9, wherein said circuit means is a varistor.

11. A control system according to claim 8, in which said storage means is a capacitor.

12. A control system according to claim 11, further comprising a varistor connected between said input circuit and said capacitor for increasing the repetition rate of said pulses for error signals of larger amplitudes disproportionately with respect to error signals of smaller amplitudes.

13. A control system according to claim 8, wherein said control means comprises thyratron means biased for response to a predetermined potential of the energy stored in said storage means.

14. A servomotor control system comprising in combination, a pair of input terminals adapted to have an error signal applied thereto, a capacitor continuously connected to said input terminals, resistive circuit means interposed between said capacitor and said terminals for limiting the charging rate of said capacitor in response to an error signal of predetermined amplitude, servomotor means including oppositely poled windings, said servomotor means having one direction of displacement in response to current flow through one of said windings and the opposite direction of displacement in response to current flow through the other of said windings, a pair of thyratrons each connected to one of said windings to cause current flow therethrough upon firing of said thyratron, both of said thyratrons being connected to fire when the voltage of said capacitor rises to a predetermined value, one or the other of said thyratrons being fired in dependence upon the polarity with which said capacitor is charged, and relay means connected for response to the firing of either of said thyratrons, said relay means being further connected to discharge said capacitor in response to the firing of either of said thyratrons.

15. A control system according to claim 14, further comprising an alternating current energizing circuit for said thyratrons and said oppositely poled windings, vibrator means connected to said energizing circuit for operation at the line frequency thereof, said vibrator means including a circuit member which is alternately connected to opposite terminals of said capacitor at said line frequency, and phase inverting means connected to said circuit member to produce two separate voltages opposite in phase derived from the potential on said circuit member, both of said thyratrons being connected to said phase inverting means each to receive an alternating control voltage therefrom, the control voltage applied to one of said thyratrons being opposite in phase with respect to the control voltage applied to the other of said thyratrons.

16. A control system according to claim 14, in which said servomotor means comprises a field structure adapted to be energized by an alternating current source, and phase sensitive rotor means which revolves in one direction in response to the flow of current through one of said windings and revolves in the opposite direction in response to current flow through the other of said windings, the firings of said thyratrons being in synchronism with said alternating current source.

17. A control system according to claim 14, in which said servomotor means comprises an armature cooperating with said oppositely poled windings, said armature being energized by a direct current source, the speed of rotation of said armature being determined by the repetition rate of successive firings of one or the other of said thyratrons.

18. A control system according to claim 14, wherein the resistance of said resistive circuit element decreases in response to an increase in the amplitude of said error signal.

References Cited in the file of this patent

UNITED STATES PATENTS

| | | |
|---|---|---|
| 2,343,116 | Ryder et al. | Feb. 29, 1944 |
| 2,423,524 | Side | July 8, 1947 |
| 2,452,769 | Lang | Nov. 2, 1948 |
| 2,455,364 | Hays | Dec. 7, 1948 |
| 2,506,531 | Wild | May 2, 1950 |
| 2,528,017 | Stanton | Oct. 31, 1950 |
| 2,529,490 | Field | Nov. 14, 1950 |
| 2,544,790 | Hornfeck | Mar. 13, 1951 |
| 2,600,003 | Knauth et al. | June 10, 1952 |
| 2,677,095 | Maltby | Apr. 27, 1954 |
| 2,685,056 | Hester | July 27, 1954 |
| 2,713,135 | Macklem | July 12, 1955 |

OTHER REFERENCES

American Standard Definitions of Electrical Terms, published by AIEE, N.Y., 1942, Definition 10.10.355, p. 63.

Terman: Electronic and Radio Engineering, p. 351, Figs. 10-19, McGraw-Hill, New York, 1955.